Feb. 22, 1927.

E. P. LANDSBERGER 1,618,761

HEATER

Filed May 7, 1926

Inventor

Ernest P Landsberger

By [signature]

Attorney

Patented Feb. 22, 1927.

1,618,761

UNITED STATES PATENT OFFICE.

ERNEST P. LANDSBERGER, OF HASTINGS, MINNESOTA.

HEATER.

Application filed May 7, 1926. Serial No. 107,418.

The present invention relates to a heater insertible in the oil drain plug opening of an automobile motor.

In cold weather the oil which is intended to lubricate a motor becomes coagulated by chilling to a point where it sometimes is incapable of being carried to the bearings which it is intended to lubricate, with the consequence that the bearings do not receive a proper supply of oil, and the life of said bearings is materially shortened. Further, the coagulation of the oil renders the motor so stiff as to make starting extremely difficult and places a heavy drain on the battery.

An object of the present invention is to mount a heating element in a fitting which is threadedly insertible in the crank case drain plug opening of an automobile motor, and to connect the heating element to the storage battery of the automobile, the joint between the fitting which is insertible in the drain plug opening, and the electrical connection to the battery being weather tight and readily removable from said fitting to permit the removal of the fitting from said opening in draining the crank case of oil.

In order to attain this object, there is provided in accordance with one feature of the invention, a threaded member insertible in the oil drain plug opening of the crank case of an automobile motor, said threaded member having a hermetically sealed tubular casing firmly connected thereto to extend upwardly interiorly of the crank case to be positioned within a supply of oil therein, said casing having a heating element mounted therein. One end of the heating element is grounded to the crank case of the motor, while the other end thereof is connected through suitable electrical conducting means to one terminal of the storage battery of the motor car, the other terminal of the battery being grounded to the frame of the car, which is electrically connected to the crank case. Suitable switch means are mounted in the conductor to govern the operation of the device.

These and other features of the invention, not specifically mentioned, will be more fully brought out in the following description and the accompanying drawings, wherein.

Figure 1:
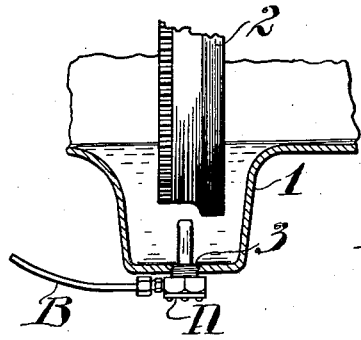
Figure 1, is a view in longitudinal section through a portion of a crank case of an automobile motor having a heating device made in accordance with the present invention threadedly inserted in the drain plug opening thereof.
Figure 3:
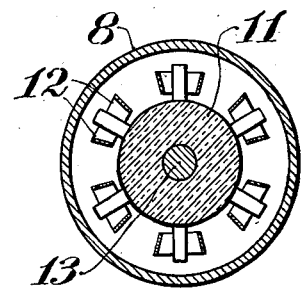
Figure 3, is a view in transverse section through the device shown in Figure 2, showing the construction of the heating element support.
Figure 2:
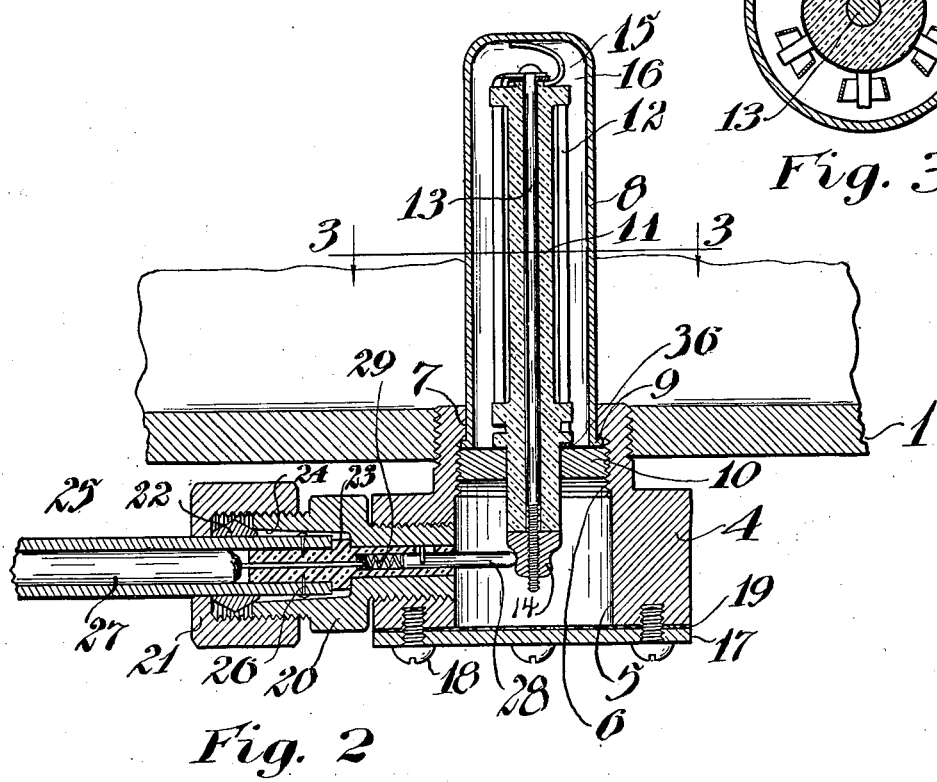
Figure 2, is a view in longitudinal section through the heating device shown in Figure 1.

Referring to the drawings in detail, a crank case 1 of a motor car is of a conventional type having a fly wheel 2 mounted therein. In the lower portion of the crank case a threaded opening 3 is provided through which the lubricating oil may be drained.

Threaded into the opening 1 is a heating device A having an electrical conductor B removably connected thereto. The heating device comprises a plug member 4 having a lower hexagonal portion with an outwardly threaded upper portion, the threads thereof being of a size to threadedly engage the threads in the drain plug opening 3.

The member 4 is drilled out centrally as at 5, the upper portion thereof having threads 6 interiorly thereof and an inwardly extending flange 7 at the upper end thereof. A tubular member 8, having the upper end thereof closed, and an outwardly extending flange 9 around the lower end thereof, is of a size to have a close sliding fit within the flange 7. The flange 9, extending outwardly around the lower edge of tubular member 8, engages the lower face of flange 7 to closely contact therewith.

Threadedly insertible into the threads 6 interiorly of the central opening of the plug 4 is a nut 10 having a central opening of a size to receive a support member 11 of insulative and heat resistive material such as porcelain, upon which is mounted a heating element 12 which may be of resistance ribbon of a well known type.

Extending longitudinally of the insulating member through a hole centrally thereof is a metal screw 13 having a nut 14 threadedly mounted on the lower end thereof. The upper end of said screw is in electrical contact with one end of the resistance wire, a spring 15 being mounted on the upper end of said screw, but electrically insulated therefrom as by means of mica washers 16. The other end of the resistance wire, to that in electrical contact with the screw member 13, is electrically connected to the crank case of the motor as by being placed in contact with the nut 10 as at 36.

A metal plate 17 is connected across the bottom of the plug portion 4 as by means of screws 18, a gasket 19 being provided to form a seal across this opening and prevent the entrance of dirt and moisture therein.

Threaded into an opening in the side of the plug 4 is a compression coupling comprising portions 20 and 21 with a sleeve 22 mounted between said portions in a well known manner. The inner portion 21 has a central opening therein of a size to slidably receive an insulative sleeve 23 therein, the upper portion of said central opening being enlarged as at 24 to receive a metal pipe 25 connected to said sleeve member as by means of pins 26. The metal pipe may be of brass or other suitable material and carries an insulated electrical conductor 27. The conductor 27 is bared of insulation for a portion of its length and is inserted through the sleeve 23, the end of said conductor being soldered, or otherwise suitably connected to a metal contact pin 28 which makes electrical connection with a spring 29. The spring 29 holds the contact pin 28 resiliently outward so as to place the contact pin into contact with the nut 14 threaded on the lower end of screw member 13.

To remove the device for the purpose of draining the oil from the crank case of the motor, the outer portion 21 of the compression coupling is unscrewed from the portion 20 and the metal pipe withdrawn, carrying with it the insulative sleeve 23 and the contact pin 28. A wrench may then be applied to the hexagonal plug 4 and this may be unscrewed from the opening 3 in the crank case to allow the oil to drain therefrom.

To replace the device, the operation is reversed. The electrical circuit for the device is apparent without further illustration, and the switch means for controlling the device, being of a well known type, also require no illustration.

I claim:

A combined oil drain plug and crank case heater, comprising a threaded plug member, a tubular casing carried thereby to have oil tight connection therewith, a supporting post of refractive material mounted within said tubular casing, said post having arms of similar material projecting radially outward therefrom at the top and bottom thereof, an electrically conductive member extending interiorly of said post, a resistance element supported upon said arms to be spaced outwardly from said post, one end of said heating element having electrical connection with said threaded plug member and the other end thereof having electrical connection with the conductive member mounted interiorly of said refractive post, a removable contact member having electrical connection with a source of electric current and having electrical connection with the conductive member mounted interiorly of the refractive post, and threaded means engaging said threaded plug member and encircling said contact member to form an oil tight seal therewith.

In testimony whereof I affix my signature.

ERNEST P. LANDSBERGER.